US009242471B2

(12) United States Patent
Yoneda et al.

(10) Patent No.: US 9,242,471 B2
(45) Date of Patent: Jan. 26, 2016

(54) METHOD AND APPARATUS FOR MANUFACTURING LIQUID CONTAINER (75) Inventors: Isamu Yoneda, Kawasaki (JP); Akira Shiba, Machida (JP); Ryota Yamada, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 739 days.

(21) Appl. No.: 13/401,616

(22) Filed: Feb. 21, 2012

(65) Prior Publication Data

US 2012/0216491 A1 Aug. 30, 2012

(30) Foreign Application Priority Data

Feb. 25, 2011 (JP) ................................. 2011-039409

(51) Int. Cl.
*B65B 3/18* (2006.01)
*B41J 2/175* (2006.01)
*B41J 2/19* (2006.01)
*B23P 19/027* (2006.01)

(52) U.S. Cl.
CPC .......... *B41J 2/17513* (2013.01); *B41J 2/17559* (2013.01); *B41J 2/19* (2013.01); *B65B 3/18* (2013.01); *B23P 19/027* (2013.01); *B41J 2/17556* (2013.01); *Y10T 29/49872* (2015.01)

(58) Field of Classification Search
CPC ............ B23P 19/027; B65B 3/18; B41J 2/19; B41J 2/17556
USPC ............. 29/890.1, 451, 244, 286, 286.5, 284; 141/2; 53/452, 467; 347/86
See application file for complete search history.

(56) References Cited

U.S. PATENT DOCUMENTS

| 5,477,255 A | * | 12/1995 | Huth ............................... 347/87 |
| 6,058,984 A | | 5/2000 | Sato ................................. 141/7 |
| 6,059,916 A | * | 5/2000 | Betschon ....................... 156/256 |
| 6,286,947 B1 | | 9/2001 | Kitabatake et al. ............. 347/86 |
| 6,435,675 B2 | * | 8/2002 | Okura et al. .................... 347/86 |
| 6,585,361 B1 | * | 7/2003 | Jones .............................. 347/86 |

(Continued)

FOREIGN PATENT DOCUMENTS

| CN | 101189131 | 5/2008 |
| CN | 101332717 | 12/2008 |
| CN | 101746126 | 6/2010 |
| JP | 08-090783 | 4/1996 |

(Continued)

OTHER PUBLICATIONS

Chinese Office Action dated Apr. 3, 2014 in counterpart Chinese Patent Application No. 201210045097.9, and English translation.
U.S. Appl. No. 13/401,609, filed Feb. 21, 2012.

*Primary Examiner* — Jermie Cozart
(74) *Attorney, Agent, or Firm* — Fitzpatrick, Cella, Harper & Scinto (57) ABSTRACT

A compression member is used to press a first outer surface of a negative pressure generating member which contacts a surface of a partition wall and to press a second outer surface of the negative pressure generating member which contacts an inner surface of a first recessed portion located opposite the partition wall. The negative pressure generating member is placed in the first recessed portion with releasing the pressure exerted on the first outer surface while maintaining the pressure exerted on the second outer surface. After the negative pressure generating member is placed in the first recessed portion, the pressure exerted on the outer surface of the negative pressure generating member is released.

9 Claims, 6 Drawing Sheets (56) References Cited

U.S. PATENT DOCUMENTS

| | | | |
|---|---|---|---|
| 6,874,875 B1 * | 4/2005 | Anderson et al. | 347/86 |
| 2001/0015743 A1 * | 8/2001 | Okura et al. | 347/86 |
| 2002/0167570 A1 | 11/2002 | Udagawa et al. | 347/85 |
| 2006/0152558 A1 | 7/2006 | Hoisington | 347/84 |
| 2006/0221151 A1 * | 10/2006 | Katada | 347/86 |
| 2010/0011577 A1 | 1/2010 | Yoneda | 29/890.1 |
| 2010/0141722 A1 | 6/2010 | Saito et al. | 347/92 |

FOREIGN PATENT DOCUMENTS

| | | |
|---|---|---|
| JP | 11-048490 | 2/1999 |
| JP | 2000-233519 | 8/2000 |
| JP | 3287791 | 6/2002 |
| JP | 2002-225308 | 8/2002 |
| JP | 2007-313817 | 12/2007 |
| JP | 2008-036963 | 2/2008 |
| KR | 2005040152 A * | 5/2005 |

* cited by examiner

METHOD AND APPARATUS FOR MANUFACTURING LIQUID CONTAINER

BACKGROUND OF THE INVENTION

1. Field of the Invention

The present invention relates to a method and apparatus for manufacturing a liquid container in which any of various liquids is contained, such as an ink tank in which ink is contained.

2. Description of the Related Art

In a liquid ejection apparatus using a liquid ejection head capable of ejecting a liquid such as ink, a liquid container in which a liquid is contained is connected to an upstream side of a supply system for supplying the liquid to the liquid ejection head. For example, in an ink jet printing apparatus (liquid ejection apparatus) using an ink jet print head (liquid ejection head) capable of ejecting ink, an ink tank (liquid container) in which ink is accommodated is removably connected to an upstream side of an ink supply system.

Figure 5:
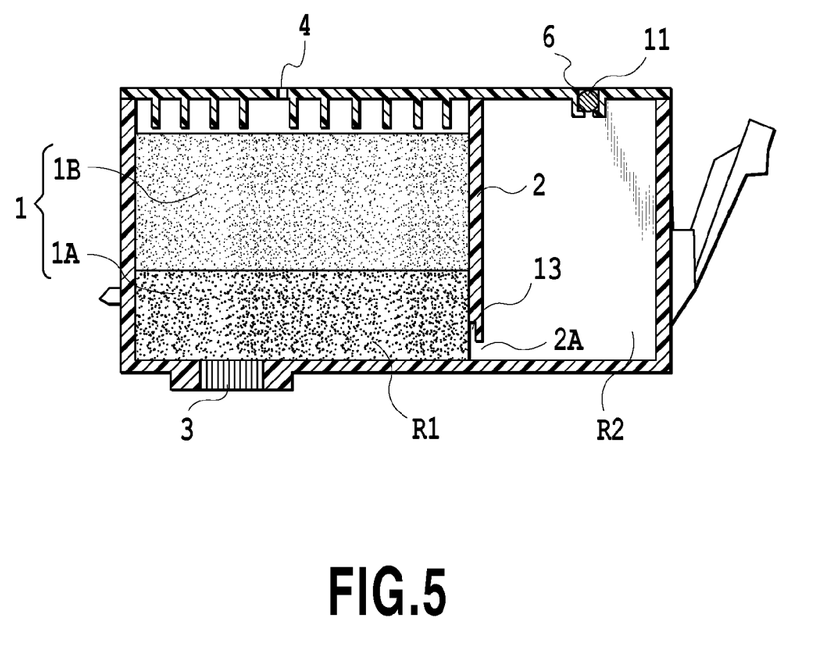
FIG. 5 is a cross-sectional view illustrating an example of a conventional liquid container.
Figure 6:
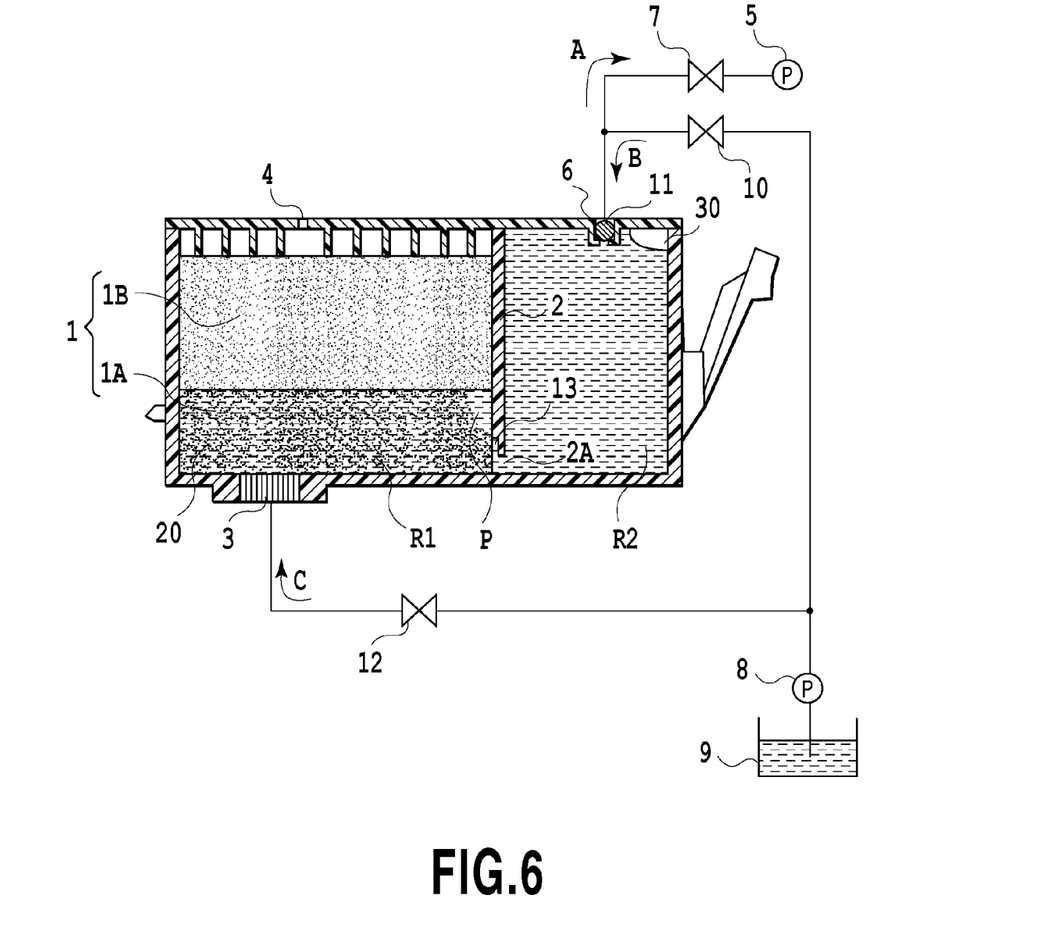
FIG. 6 is a diagram illustrating a method for filling ink into the liquid container in FIG. 5.

Some ink tanks in such ink jet printing apparatuses include a first chamber R1 in which an ink absorber as a negative pressure generating member 1 (1A and 1B) is accommodated, and a second chamber R2 in which ink is directly accommodated, as shown in FIG. 5 and FIG. 6. The first and second chambers R1 and R2 are in communication with each other via a communication portion 2A formed in a partition wall 2. FIG. 5 is a cross-sectional view of the ink tank in which no ink is contained. FIG. 6 is a cross-sectional view of the ink tank in which ink is contained.

As a method for filling ink into such an ink tank, a filling method described in Japanese Patent Laid-Open No. 11-48490 is known. In the filing method, first, an ink supply port 3 and an atmospheric communication port 4 are closed. Then, a pump 5 is used to discharge air from the ink tank in a direction of arrow A through an ink filling hole 6 and a valve 7, thus reducing the pressure in the first and second chambers R1 and R2. Thereafter, the valve 7 is closed, and a pump 8 is used to feed ink 20 from an ink reservoir 9 in a direction of arrow B to fill the ink 20 into the second chamber R2 through a valve 10 and the ink filling hole 6. At this time, the ink 20 permeates only a part of a surface of the negative pressure generating member 1 in the first chamber R1 through a communication portion 2A. Then, the valve 10 is closed, and the pump 8 is used to feed the ink 20 from the ink reservoir 9 in a direction of arrow C to fill the ink 20 into the first chamber R1 through a valve 12 and the ink supply port 3. The ink 20 in the first chamber R1 is absorbed and held by the capillary force of the negative pressure generating member 1. Thereafter, the ink supply port 3 is closed, and the atmospheric communication port 4 is opened to completely cancel the reduced pressure state in the first and second chambers R1 and R2 (the first and second chambers R1 and R2 are open to the atmosphere). A ball 11 then close the ink filling hole 6.

The ink supply port 3 of the ink tank with the ink thus filled therein is connected to an ink jet print head (not shown in the drawings). The ink 20 absorbed and held in the first chamber R1 by the negative pressure generating member 1 is supplied to the print head, with a negative pressure applied to the ink 20. As the ink 20 is supplied, the ink in the second chamber R2 is fed into the first chamber R1 through the communication portion 2A. A corresponding amount of air is fed from the atmospheric communication port 4 into the second chamber R2 through an atmospheric introducing channel 13 and the communication portion 2A.

However, when the ink is filled into the ink tank, a portion P permeated by the ink 20 mixed with air may be generated near the partition wall 2 in the negative pressure generating member 1. Such a phenomenon occurs when the first and second chambers R1 and R2 are opened to the atmosphere, that is, when the atmospheric communication port 4 is opened to completely cancel the reduced pressure state in the ink tank, causing the ink 20 in the first chamber R1 to be pressed downward in FIG. 6 by the atmospheric pressure. That is, the ink in the first chamber R1 mainly flows from a position near the partition wall 2 through the communication portion 2A into the second chamber R2. To make up for the ink 20 having flown into the second chamber R2, the ink gathers at the position near the partition wall 2 from the entire negative pressure generating member 1. At this time, if a portion of the negative pressure generating member 1 which is located near the partition wall 2 fails to have the appropriate density, the portion offers reduced flow resistance, thus increasing the speed at which the ink 20 flows into the second chamber R2 through the portion and the communication portion 2A. The air having entered the first chamber R1 through the atmospheric communication port 4 flows into the portion near the partition wall 2 so as to be entrained in the ink flowing in at high speed. As a result, the ink 20 and the air are mixed together in the portion P of the negative pressure generating member 1 which is located near the partition wall 2.

If immediately after ink filling or during a distribution process after shipment, an impact is made on the ink tank with the ink 20 and the air mixed together in the portion P of the negative pressure generating member 1 as described above, a gas-liquid exchange is likely to occur through the communication portion 2A so as to fill the portion P with the ink. That is, the air present in the portion P is likely to be exchanged with the ink 20 in the second chamber R2 through the communication portion 2A. If such a gas-liquid exchange occurs, the volume of air bubbles 30 present in the second chamber R2 increases.

The air bubbles 30 present in the second chamber R2 expand with a rise in temperature or a decrease in atmospheric pressure. Thus, an amount of the ink 20 in the second chamber R2 corresponding to the expanded volume flows into the first chamber R1 and is absorbed by the negative pressure generating member 1. However, if the amount of the ink 20 flowing into the first chamber R1 exceeds the amount of the ink absorbed by the negative pressure generating member 1, the ink may leak from the ink supply port 3 when a seal (not shown in the drawings) is torn off to allow the use of the ink tank to be started. Thus, when the ink tank is shipped, the volume of the air bubbles 30 present in the second chamber R2 needs to be appropriately managed. However, if the amount of the air bubbles 30 increases as a result of an additional amount of air from the portion P with the ink and the air mixed therein, the amount of the air bubbles 30 may exceed the range of values within which the amount can be appropriately managed.

A possible measure for preventing generation of the portion P with the ink and the air mixed therein is to increase the duration of the operation of opening the chambers to the atmosphere when the ink is filled into the chambers. That is, the reduced pressure state in the ink tank may be gradually canceled to reduce the force of the atmospheric pressure pressing the ink and thus the speed at which the ink 20 flows from the first chamber R1 into the second chamber R2 is downed so that the ink 20 can be fed from the entire negative pressure generating member 1 into the second chamber R2. However, to achieve this, the duration of the operation of opening the chambers to the atmosphere needs to be set to at least several tens of seconds. This reduces the efficiency of the ink filling operation and thus the productivity of the ink tank.

SUMMARY OF THE INVENTION

The present invention provides a method and apparatus for manufacturing a liquid container that enables the amount of air present in the liquid container to be appropriately managed.

In the first aspect of the invention, there is provided a method for manufacturing a liquid container in which a negative pressure generating member is contained in a first recessed portion separated from a second recessed portion by a partition wall with a communication portion formed therein, the method comprising: a compression step of pressing, before the negative pressure generating member is placed in the first recessed portion, a plurality of outer surfaces of the negative pressure generating member by a compression member so that the negative pressure generating member becomes smaller than an opening of the first recessed portion, the plurality of outer surfaces of the negative pressure generating member including a first outer surface which is to contact a surface of the partition wall positioned in the first recessed portion and a second outer surface which is to contact an inner surface of the first recessed portion lying opposite the partition wall; and a placing step of placing the negative pressure generating member in the first recessed portion while releasing the pressure exerted on the first outer surface by the compression member and maintaining the pressure exerted on the second outer surface by the compression member, and after the negative pressure generating member is placed in the first recessed portion, releasing the pressure exerted on the second outer surface by the compression member.

In the second aspect of the invention, there is provided an apparatus for manufacturing a liquid container in which a negative pressure generating member is contained in a first recessed portion separated from a second recessed portion by a partition wall with a communication portion formed therein, the apparatus comprising: compression unit configured to press, before the negative pressure generating member is placed in the first recessed portion, a plurality of outer surfaces of the negative pressure generating member by a compression member so that the negative pressure generating member becomes smaller than an opening of the first recessed portion, the plurality of outer surfaces of the negative pressure generating member including a first outer surface which is to contact a surface of the partition wall positioned in the first recessed portion and a second outer surface which is to contact an inner surface of the first recessed portion lying opposite the partition wall; and placing unit configured to place the negative pressure generating member in the first recessed portion while releasing the pressure exerted on the first outer surface by the compression member and maintaining the pressure exerted on the second outer surface by the compression member, and after the negative pressure generating member is placed in the first recessed portion, release the pressure exerted on the second outer surface by the compression member, wherein the compression member includes a first compression member pressing the first outer surface and a second compression member pressing the second outer surface, the compression unit keeps the negative pressure generating member compressed at a position opposite to the opening of the first recessed portion, and the placing unit moves an insertion pawl extending from the second compression member, along the inner surface of the first recessed portion, and then move the negative pressure generating member from the opposite position into the first recessed portion.

Further features of the present invention will become apparent from the following description of exemplary embodiments (with reference to the attached drawings).

BRIEF DESCRIPTION OF THE DRAWINGS

FIG. 3A to FIG. 3F are cross-sectional views illustrating procedures in which the manufacturing apparatus in FIG. 1 inserts a negative pressure generating member;

DESCRIPTION OF THE EMBODIMENTS

Embodiments of the present invention will be described below with reference to the drawings.

First Embodiment

Figure 1:
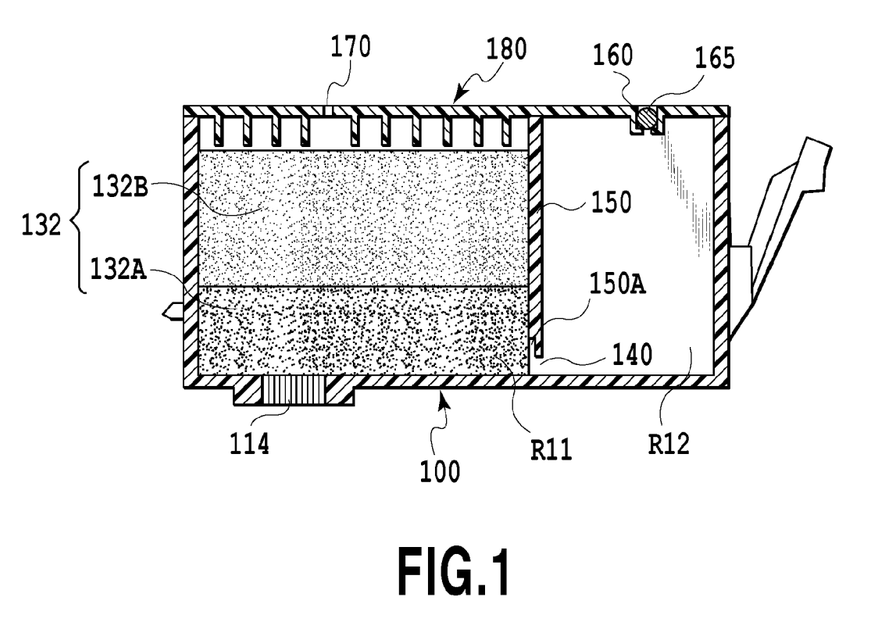
FIG. 1 is a cross-sectional view of a liquid container that can be manufactured by the present invention.

FIG. 1 is a cross-sectional view illustrating an example of a configuration of an ink tank in which ink is accommodated and which serves as a liquid container that can be manufactured by the preset invention.

Figure 2:
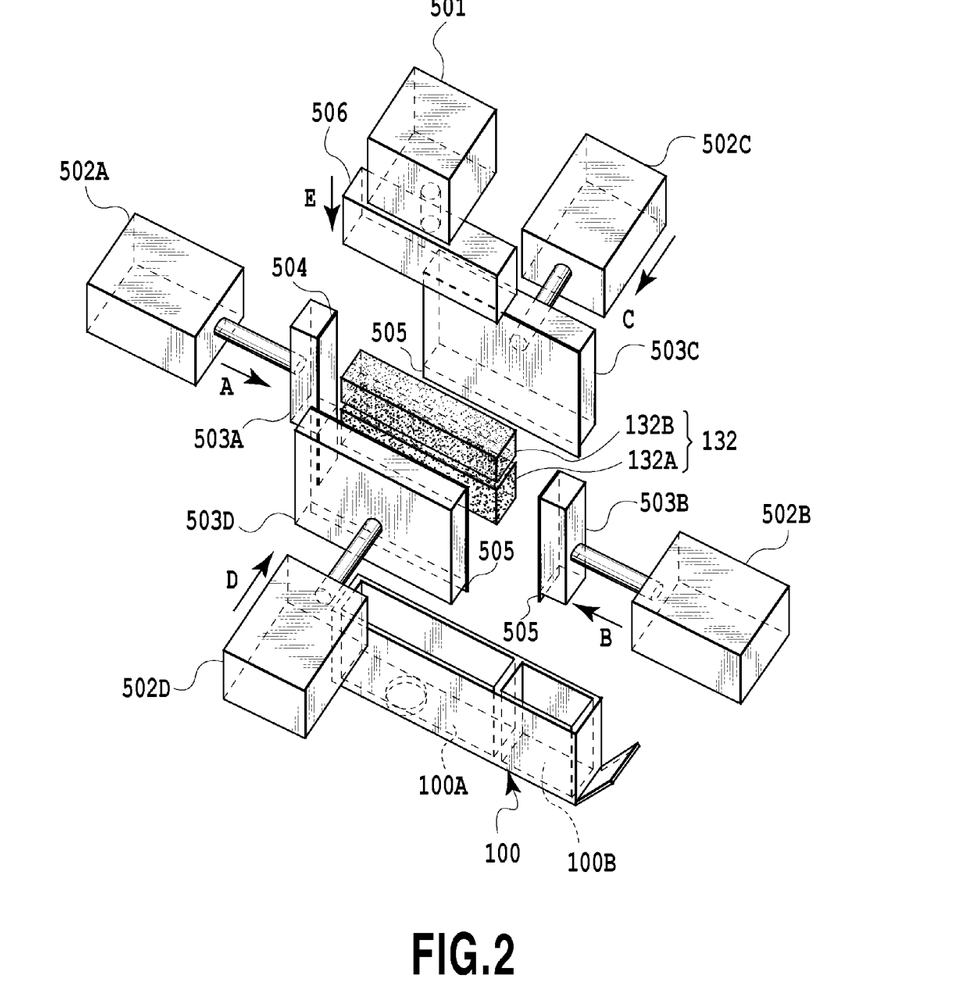
FIG. 2 is a perspective view of an essential part of a manufacturing apparatus according to a first embodiment of the present invention.

In a tank main body (container main body) 100, a first recessed portion 100A and a second recessed portion 100B are formed as shown in FIG. 2. A fibrous ink absorber formed of a thermoplastic olefin resin is accommodated in the first recessed portion 100A as a negative pressure generating member 132. The recessed portions 100A and 100B are separated from each other by a partition wall 150 with a communication portion 140 formed therein. The recessed portions 100A and 100B and the partition wall 150 are integrally molded into the tank main body 100. A cover member 180 is fixed to an opening of the main body 100 by fixing means (not shown in the drawings) including welding or an adhesive; in FIG. 1, the opening is located in the upper side of the tank main body 100.

The recessed portions 100A and 100B are both covered by the cover member 180. The recessed portion 100A forms a first chamber R11 in which the negative pressure generating member 132 is accommodated. The recessed portion 100B forms a second chamber R12 in which ink is directly accommodated. An atmospheric communication port (atmospheric communication portion) 170 is formed in a portion of the cover member 180 which corresponds to the first chamber R11 so that air can be fed in through the atmospheric communication port 170 as ink in the ink tank is consumed. Furthermore, an ink filling hole (liquid filling hole) 160 through which ink is filled is formed in a portion of the cover member 180 which corresponds to the second chamber R12. The ink filling hole 160 is closed by a ball 165 after the ink tank has been filled with ink. The tank main body 100 includes a supply port 114 formed therein to supply the ink in the first chamber R11 to an ink jet print head (liquid ejection head; not shown in the drawings). Furthermore, an air introducing channel 150A that communicates with the communication portion 140 is formed in a surface of the partition wall 150 positioned in the first chamber R11. In the present example, the negative pressure generating member 132 includes a first negative pressure generating member 132A and a second negative pressure generating member 132B which exert different capillary forces. The capillary force Pa of the first negative pressure generating member 132A is greater than the capillary force Pb of the second negative pressure generating member 132B (Pa>Pb). The first negative pressure generating member 132A is positioned closer to the ink supply port 114 (on the lower side of FIG. 1). The second negative pressure generating member 132B is positioned closer to the atmospheric communication port 170 (on the upper side of FIG. 1).

FIG. 2 is a diagram illustrating an insertion device in a manufacturing apparatus manufacturing the above-described ink tank which device inserts the negative pressure generating member 132 into the first recessed portion 100A. The negative pressure generating member 132 has not been inserted into the insert device yet, and the tank main body 100 with the cover member 180 not fixed thereto yet is set in the insertion device.

Figure 4:
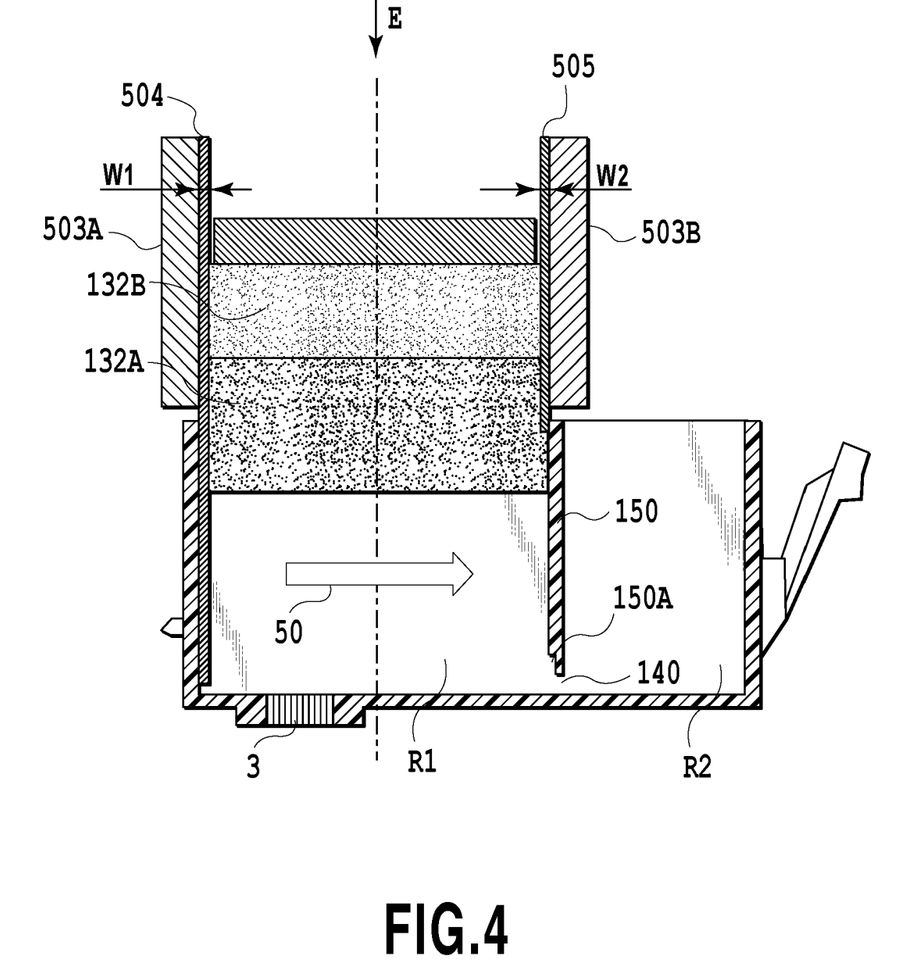
FIG. 4 is a cross-sectional view illustrating a middle stage of a step of inserting the negative pressure generating member in FIG. 3.

Cylinders are shown at 501, 502A, 502B, 502C, and 502D. Columnar rod members on the cylinders can be reciprocated along the extending directions of the rod members (the directions of arrows E, A, B, C, and D, respectively). The cylinders are provided in movable members (not shown in the drawings) which are movable up and down, with respect to the tank main body 100 oriented so that the opening is positioned in the upper portion thereof. The tank main body 100, oriented so that the opening is positioned in the upper portion thereof, and the cylinders may be moved up and down relative to one another. For example, the tank main body 100 may be set in a movable member that is movable up and down. Compression members attached to the rod members of the cylinders 502A, 502B, 502C, and 502D are shown at 503A, 503B, 503C, and 503D, respectively. As shown in FIG. 4, the right compression member (first compression member) 503B includes an insertion pawl 505 extending downward. The left compression member (second compression member) 503A includes an insertion pawl 504 extending downward. In the present example, the four compression members 503A, 503B, 503C, and 503D form an insertion pipe shaped like a rectangular frame during compression when the compression members 503A, 503B, 503C, and 503D move rightward, leftward, forward, and backward (the directions of arrows E, A, B, C, and D) to come into contact with outer peripheral surfaces of the negative pressure generating member 132. The insertion pipe guides the compressed negative pressure generating member 132 into the first chamber R11 as described below. The first and second negative pressure generating member 132A and 132B can be contained in the insertion pipe and are pushed downward from the inside of the insertion pipe by a pressing bar 506 with an outer diameter almost equal to the inner diameter of the insertion pipe. The pressing bar 506 is attached to the rod member of the cylinder 501. The pressing bar 506 moves slidably up and down along the direction of arrow E.

FIG. 3A to FIG. 3F are cross-sectional views of an essential part of the manufacturing apparatus illustrating an inserting operation in which the insertion device inserts the negative pressure generating member 132 into the chamber.

Figure 3A:
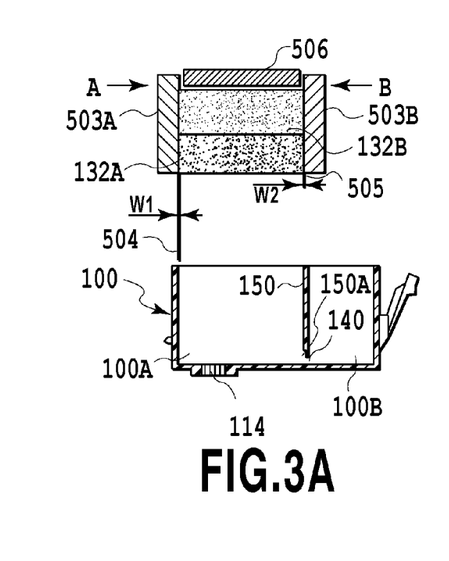

First, as shown in FIG. 3A, the tank main body 100 is prepared in which the first recessed portion 100A, the second recessed portion 100B, and the partition wall 150 are integrally molded; the ink supply port 114 is formed in the first recessed portion 100A, and the communication portion 140 and the atmosphere introducing channel 150A are formed in the partition wall 150. The tank main body 100 is set in the insertion device. The outer surfaces of the negative pressure generating member 132 (132A and 132B) are surrounded by a plurality of compression members corresponding to the shape of the negative pressure generating member 132. In the present example, the negative pressure generating member 132 is shaped like a rectangular parallelepiped, and the four compression members 503A, 503B, 503C, and 503D surround the respective four surfaces of the negative pressure generating member 132, that is, the right, left, front, and back surfaces of the negative pressure generating member 132. The first and second negative pressure generating members 132A and 132B are larger than the internal dimensions of the first recessed portion 100A. The first and second negative pressure generating members 132A and 132B are compressed into the insertion pipe shaped like a rectangular frame. A material for the negative pressure generating members 132A and 132B is fiber formed of a thermoplastic olefin resin. The insertion pawl 504 extends downward from the compression member 503A by a relatively long distance. The insertion pawl 505 extends downward from the compression member 503B by a relatively short distance. In the present example, the thickness W1 of the insertion pawl 504 is the same as the thickness W2 of the insertion pawl 505. The insertion pawls 504 and 505 may be formed as parts of the compression members 503A and 503B.

The pressing bar 506 is placed on a top surface of the negative pressure generating member 132 (132A and 132B) in the insertion pipe. A bottom surface of the negative pressure generating member 132 is directed to the opening of the first recessed portion 100A. The compression members 503A, 503B, 503C, and 503D are used to collapse the negative pressure generating member 132 so that the negative pressure generating member 132 becomes smaller than the opening of the first recessed portion 100A. In this manner, the negative pressure generating member 132 is maintained in a compressed state at an opposite position where the negative pressure generating member 132 lies opposite the opening of the first recessed portion 100A.

Figure 3B:
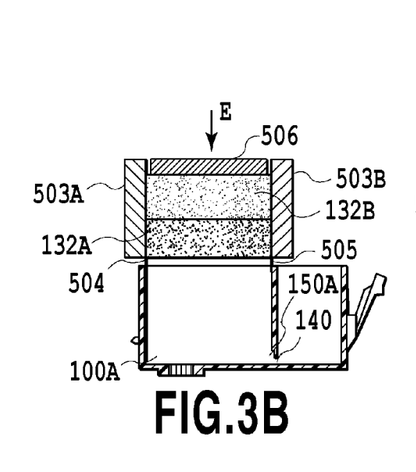

Then, as shown in FIG. 3B, the insertion pipe is moved downward to insert the left and right insertion pawls 504 and 505 into the opening of the first recessed portion 100A. The right insertion pawl 505 is inserted along an inner surface of the partition wall 150. The left insertion pawl 504 is inserted along a left inner surface of the first recessed portion 100A which lies opposite the partition wall 150. The insertion pawl 504 is inserted until the insertion pawl 504 is positioned near a bottom surface of the first recessed portion 100A as shown in FIG. 4 or reaches the bottom surface. The insertion pawl 505 is inserted only to the vicinity of the opening of the first recessed portion 100A as shown in FIG. 4.

Figure 3C:
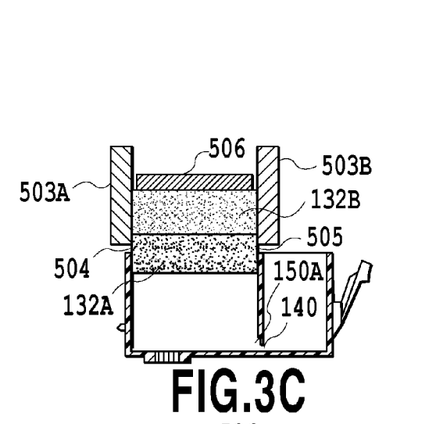

Then, as shown in FIG. 3C, the cylinder 501 is used to move the pressing bar 506 in the direction of arrow E to push the negative pressure generating member 132 (132A and 132B) into the first recessed portion 100A. In the operation of inserting the negative pressure generating member 132 as described above, as shown in FIG. 4, a portion of the first negative pressure generating member 132A which has passed downward from the insertion pawl 505 is released from compression applied by the insertion pawl 505 and expands in the direction of arrow 50 toward the partition wall 150 under a restoring force. That is, the first negative pressure generating member 132A is placed in the first recessed portion 100A while being released from pressure exerted by the insertion pawl 505 on an outer surface (first outer surface) of the first negative pressure generating member 132A shown on the right side of FIG. 3C. At this time, an outer surface (second outer surface) of the first negative pressure generating member 132A shown on the left side of FIG. 3C remains pressed by the insertion pawl 504. The first negative pressure generating member 132A is positioned between the insertion pawl 504 and the partition wall 150 by moving a distance equal to the thickness W2 of the insertion pawl 505, in the direction of arrow 50, from the position between the insertion pawls 504 and 505 at which the first negative pressure generating member 132 is located before the insertion. That is, the first negative pressure generating member 132A is moved as described above and displaced toward the partition wall 150 and come into tight contact with the partition wall 150. When the first negative pressure generating member 132A is brought into tight contact with the partition wall 150 with the atmosphere introducing channel 150A formed therein, a portion of the negative pressure generating member 132 which is positioned near the partition wall 150 is deformed. The density of the portion increases consistently with the amount of the deformation. The density of a portion of the second negative pressure generating member 132B which is positioned near the partition wall 150 can be similarly increased.

Figure 3D:
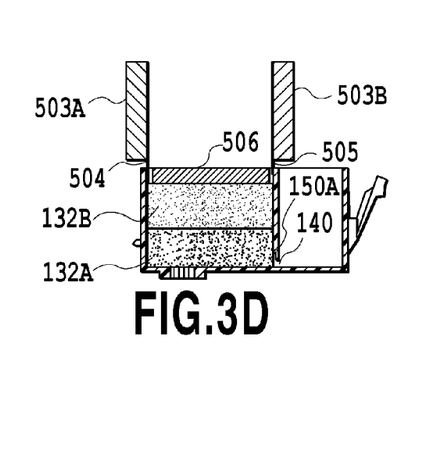

Thereafter, as shown in FIG. 3D, the first negative pressure generating member 132A is pressed downward by the pressing bar 506 via the second negative pressure generating member 132B. The first negative pressure generating member 132A is thus moved down to the bottom surface of the first recessed portion 100A with the ink supply port 114 formed therein.

Figure 3E:
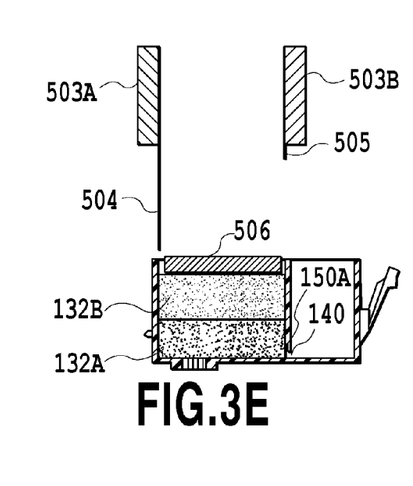
Figure 3F:
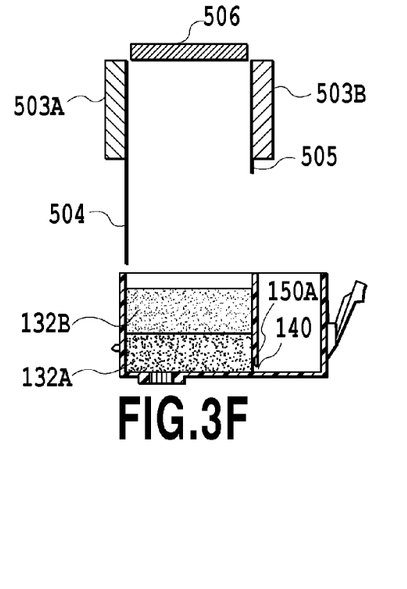

Then, as shown in FIG. 3E, with the negative pressure generating member 132 remaining pressed by the pressing bar 506, the insertion pipe formed by the four compression members 503A, 503B, 503C, and 503D and the insertion pawls 504 and 505 are pulled out of the first recessed portion 100A. When the insertion pawl 504 is pulled out, the first and second negative pressure generating members 132A and 132B are released from compression by an amount equal to the thickness W1 of the insertion pawl 504. Thereafter, as shown in FIG. 3F, the cylinder 501 is used to retract the pressing bar 506 upward. The step of inserting the negative pressure generating member 132 is thus completed.

After inserting the negative pressure generating member 132 so that the negative pressure generating member 132 tightly contacts the partition wall 150, the ink tank is completed by fixing, to the opening of the tank main body 100, the cover member 180 with the atmospheric communication port 170 and the ink filling hole 160 formed therein. The negative pressure generating member 132 is compressed against the inner surface of the first recessed portion 100A under the elastic restoring force thereof and maintains a tight contact with the partition wall 150 under the frictional force exerted between the negative pressure generating member 132 and the first recessed portion. That is, the negative pressure generating member 132 inserted into the first recessed portion is restrained, by frictional resistance, from being displaced.

The thus manufactured ink tank can be filled with ink by connecting pumps 5 and 8, an ink reservoir 9, and valves 7, 10, and 12 to the ink supply port 114 and the ink filling hole 160, as in the case in FIG. 6.

That is, first, the ink supply port 114 and the atmospheric communication port 170 are closed. The pump 5 is then used to discharge the air from the ink tank in the direction of arrow A (see FIG. 6) through the ink filling hole 160 and the valve 7, thus reducing the pressure in the first and second chambers R11 and R12. Thereafter, the valve 7 is closed, and the pump 8 is used to feed ink from the ink reservoir 9 in the direction of arrow B (see FIG. 6) to fill the ink into the second chamber R12 through the valve 10 and the ink filling hole 160. At this time, the ink permeates only a part of the surface of the negative pressure generating member 132 in the first chamber R11 through the communication portion 140. Then, the pump 8 is used to feed the ink 20 from the ink reservoir 9 in the direction of arrow C (see FIG. 6) to fill the ink 20 into the first chamber R11 through the valve 12 and the ink supply port 114. The ink in the first chamber R11 is absorbed and held by the capillary force of the negative pressure generating member 132. Thereafter, the ink supply port 114 is closed, and the atmospheric communication port 170 is opened to completely cancel the reduced pressure state in the first and second chambers R11 and R12 (the first and second chambers R11 and R12 are open to the atmosphere). The ball 165 then close the ink filling hole 160. When the ink tank is shipped, the ink supply port 114 is sealed with a seal (not shown in the drawings), which is torn off when the ink tank is used.

When the ink tank is used, the ink supply port 114 with the seal torn off is connected to an ink jet print head (not shown in the drawings). The ink absorbed and held in the first chamber R11 by the negative pressure generating member 132 is supplied to the print head with a negative pressure applied thereto. As the ink 20 is supplied, the ink in the second chamber R12 is fed into the first chamber R11 through the communication portion 140. A corresponding amount of air is fed from the atmospheric communication port 170 into the second chamber R12 through the atmospheric introducing channel 150A and the communication portion 140.

As described above, when the ink tank is shipped, the amount of air bubbles present in the second chamber needs to be appropriately managed. That is, when the amount of the air bubbles present the second chamber exceeds a predetermined value, the ink may leak from the ink supply port when the seal on the ink supply port is torn off to allow the use of the ink tank to be started. However, if a portion P (see FIG. 6) with ink and air mixed therein is generated in the ink tank, the amount of the air bubbles in the second chamber increases as a result of an additional amount of air from the portion P. The amount of the air bubbles may exceed the range of values within which the amount can be appropriately managed.

As described above, the portion P (see FIG. 6) with the ink and the air mixed therein is generated, if a portion of the negative pressure generating member which is located near the partition wall has an inappropriate density, and when, during an ink filling operation, the atmospheric communication port is opened to cancel the reduced pressure state in the ink tank (the chambers are open to the atmosphere). That is, the portion of the negative pressure generating member which is positioned near the partition wall offers reduced flow resistance, thus increasing the speed at which the ink flows from the first chamber into the second chamber through the portion and the communication portion. The air having entered the first chamber through the atmospheric communication port flows into the portion near the partition wall so as to be entrained in the ink flowing in at high speed by passing through the portion near the partition wall in a centralized manner. As a result, the portion P with the ink and the air mixed therein is generated near the partition wall.

According to the present embodiment, as described above, the negative pressure generating member 132 is brought into tight contact with the partition wall 150 to enable an increase in the density of the portion of the negative pressure generating member 132 which is positioned near the partition wall 150, and thus in the flow resistance of the portion. When the chambers are opened to the atmosphere during the ink filling operation, the reduced flow resistance serves to reduce the speed at which the ink flows from the first chamber R11 into the second chamber R12 through the communication portion 140 and the portion of the negative pressure generating member 132 which is positioned near the partition wall 150. Thus, the ink can be fed from the entire negative pressure generating member 132 into the second chamber R12 without being concentrated at the portion of the negative pressure generating member 132 which is positioned near the partition wall 150. This enables the air to be prevented from being entrained in the ink. As a result, the portion P (see FIG. 6) with the ink and the air mixed therein can be restrained from being generated without the need to increase the duration of the operation of opening the chambers to the atmosphere during ink filling.

Second Embodiment

According to the above-described embodiment, the thickness W1 of the insertion pawl 504 is the same as the thickness W2 of the insertion pawl 505.

In the present embodiment, the thickness W1 of the insertion pawl 504 is double the thickness W2 of the insertion pawl 505 (W1=2×W2). This allows the negative pressure generating member 132 to more tightly contact the partition wall 150 than in the above-described embodiment. That is, when the negative pressure generating member 132 is compressively held in the insertion pipe formed by four compression members as is the case with the above-described embodiment, the negative pressure generating member 132 can be inserted into the first recessed portion 100A so as to be further positionally biased toward the partition wall 150. Thus, a change in the thickness W1 of the insertion pawl 504 allows the contact of the negative pressure generating member 132 with the partition wall 150 to be adjusted.

Other Embodiments

The compression member 503B need not necessarily include the insertion pawl 505. The insertion device has only to be configured such that the negative pressure generating member 132 may be inserted into the first recessed portion 100A with the compression by the compression member 503B released. In other words, the insertion device has only to be configured such that the pressure exerted by the compression member 503A can be released after the negative pressure generating member 132 has been placed in the first recessed portion 100A with the pressure by the compression member 503B released and with the pressure remaining exerted on the negative pressure generating member 132 by the compression member 53A and the insertion pawl 504. Thus, the negative pressure generating member is brought into tighter contact with the partition wall when placed in the first recessed portion. This is effective for avoiding an increase in ink inflow speed that is likely to occur in a portion of the negative pressure generating member during ink filling as described above. The above-described configuration is also effective for restraining a gap from being formed between the negative pressure generating member and the partition wall to allow the negative pressure generating member to adequately hold the ink. Furthermore, the ink filling method is not limited to the above-described embodiments. Additionally, the negative pressure generating member 132 is not limited to the configuration with the two members 132A and 132B. The negative pressure generating member 132 may include a single member or at least three members.

Furthermore, the present invention is widely applicable to liquid containers in which various liquids other than ink are contained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-039409, filed Feb. 25, 2011, which is hereby incorporated by reference herein in its entirety.

What is claimed is:

1. A method for manufacturing a liquid container in which a negative pressure generating member is contained in a first recessed portion separated from a second recessed portion by a partition wall with a communication portion formed therein, the method comprising:

a compression step of pressing, before the negative pressure generating member is placed in the first recessed portion, a plurality of outer surfaces of the negative pressure generating member so that the negative pressure generating member becomes smaller than an opening of the first recessed portion, the plurality of outer surfaces of the negative pressure generating member including a first outer surface which is pressed by a first compression member and which is to contact a surface of the partition wall positioned in the first recessed portion and a second outer surface which is pressed by a second compression member and which is to contact an inner surface of the first recessed portion lying opposite the partition wall; and a placing step of placing the negative pressure generating member in the first recessed portion while releasing the pressure exerted on the first outer surface by the first compression member and while maintaining the pressure exerted on the second outer surface by the second compression member so that the negative pressure generating member is positionally biased toward the partition wall, and after the negative pressure generating member is placed in the first recessed portion, releasing the pressure exerted on the second outer surface by the second compression member.

2. The method for manufacturing a liquid container according to claim 1, wherein the compression step includes a step of keeping the negative pressure generating member compressed at a position opposite to the opening of the first recessed portion, and the placing step includes a step of moving an insertion pawl extending from the second compression member, along the inner surface of the first recessed portion, and then moving the negative pressure generating member from the opposite position into the first recessed portion.

3. The method for manufacturing a liquid container according to claim 2, wherein in the placing step, in a case where the negative pressure generating member is moved from the opposite position into the first recessed portion, the surface of the partition wall is positioned more outwardly than the first outer surface of the negative pressure generating member pressed by the first compression member.

4. The method for manufacturing a liquid container according to claim 2, wherein in the placing step, in a case where the negative pressure generating member is moved from the opposite position into the first recessed portion, a first insertion pawl extending from the first compression member is inserted into a vicinity of the opening of the first recessed portion and a second insertion pawl extending from the second compression member is inserted into a vicinity of a bottom of the first recessed portion.

5. The method for manufacturing a liquid container according to claim 1, comprising a plurality of compression members including the first and second compression members, and the plurality of compression members form an insertion pipe surrounding the plurality of outer surfaces when the negative pressure generating member is compressed.

6. The method for manufacturing a liquid container according to claim 1, further comprising a step of fixing a cover member covering the opening of the first recessed portion and an opening of the second recessed portion.

7. An apparatus for manufacturing a liquid container in which a negative pressure generating member is contained in a first recessed portion separated from a second recessed portion by a partition wall with a communication portion formed therein, the apparatus comprising:

a compression unit configured to press, before the negative pressure generating member is placed in the first recessed portion, a plurality of outer surfaces of the negative pressure generating member by a compression member so that the negative pressure generating member becomes smaller than an opening of the first recessed portion, the plurality of outer surfaces of the negative pressure generating member including a first outer surface which is to contact a surface of the partition wall positioned in the first recessed portion and a second outer surface which is to contact an inner surface of the first recessed portion lying opposite the partition wall; and a placing unit configured to place the negative pressure generating member in the first recessed portion while releasing the pressure exerted on the first outer surface by the compression member and while maintaining the pressure exerted on the second outer surface by the compression member so that the negative pressure generating member is positionally biased toward the partition wall, and after the negative pressure generating member is placed in the first recessed portion, release the pressure exerted on the second outer surface by the compression member, wherein the compression member includes a first compression member pressing the first outer surface and a second compression member pressing the second outer surface, the compression unit keeps the negative pressure generating member compressed at a position opposite to the opening of the first recessed portion, and the placing unit moves an insertion pawl extending from the second compression member, along the inner surface of the first recessed portion, and then moves the negative pressure generating member from the opposite position into the first recessed portion.

8. The apparatus for manufacturing a liquid container according to claim 7, wherein in a case where the negative pressure generating member is moved from the opposite position into the first recessed portion, the surface of the partition wall is positioned more outwardly than the first outer surface of the negative pressure generating member pressed by the first compression member.

9. The apparatus for manufacturing a liquid container according to claim 7, wherein the placing unit causes, in a case where the negative pressure generating member is moved from the opposite position into the first recessed portion, a first insertion pawl extending from the first compression member to be inserted into a vicinity of the opening of the first recessed portion and a second insertion pawl extending from the second compression member to be inserted into a vicinity of a bottom of the first recessed portion.

* * * * *